United States Patent [19]

Pavone et al.

[11] Patent Number: 5,130,827
[45] Date of Patent: Jul. 14, 1992

[54] DISPLAY CELL HAVING ACTIVE AND PASSIVE AREAS

[75] Inventors: Frank D. Pavone, Newtown Square, Pa.; Alan G. Bruce, Metcalfe; Charles L. Guthrie, Gloucester, both of Canada

[73] Assignee: Litton Systems, Inc., Springfield, Pa.

[21] Appl. No.: 579,616

[22] Filed: Sep. 10, 1990

[51] Int. Cl.⁵ .............................................. G02F 1/13
[52] U.S. Cl. ...................................... 359/48; 359/67; 359/69; 359/71
[58] Field of Search ............... 350/334, 336, 345, 343, 350/331 R, 339 D, 339 R, 339 F; 340/784

[56] References Cited

U.S. PATENT DOCUMENTS

| | | | |
|---|---|---|---|
| 3,959,963 | 6/1976 | Murrell | 350/336 |
| 4,067,185 | 1/1978 | Huguenin | 350/336 |
| 4,077,032 | 2/1978 | Volkman | 350/336 |
| 4,198,810 | 4/1980 | Fahrenschon | 350/336 |
| 4,227,777 | 10/1980 | Murakami | 350/334 |
| 4,234,947 | 11/1980 | Matsumoto | 350/334 |
| 4,255,806 | 3/1981 | Fahrenschon et al. | 350/336 |
| 4,385,842 | 5/1983 | Weisner | 350/336 |
| 4,413,915 | 11/1983 | Besson | 350/334 |
| 4,435,046 | 3/1984 | Nishimura | 350/334 |
| 4,519,679 | 5/1985 | Horikiri et al. | 350/339 R |
| 4,541,692 | 9/1985 | Collins et al. | 350/339 D |
| 4,770,499 | 9/1988 | Kobayashi et al. | 350/339 D |
| 4,838,661 | 6/1989 | McKee et al. | 350/339 D |

FOREIGN PATENT DOCUMENTS

| | | | |
|---|---|---|---|
| 56-72416 | 6/1981 | Japan | 350/334 |
| 57-102611 | 6/1982 | Japan | 350/339 R |
| 58-162931 | 9/1983 | Japan | 350/345 |
| 2143987 | 2/1985 | United Kingdom | 340/784 |

*Primary Examiner*—Rolf Hille
*Assistant Examiner*—Minhloan Tran
*Attorney, Agent, or Firm*—Brian L. Ribando

[57] ABSTRACT

An LCD has both active and passive display areas. The active areas are presented by selective energization of dichroic liquid crystal, and the passive areas are created by a mask. The LCD cell includes a sealed cavity containing the dichroic liquid crystal which has an area substantially less than the total display area. The remaining portion of the LCD cell is free of liquid crystal and is transparent to the passage of light from a rear light source.

16 Claims, 3 Drawing Sheets

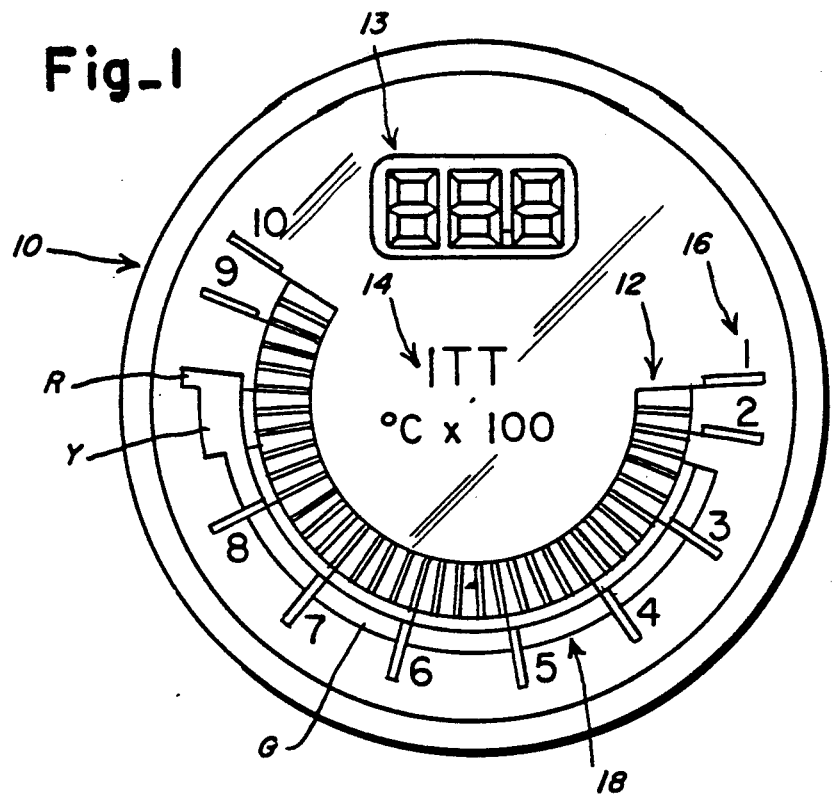
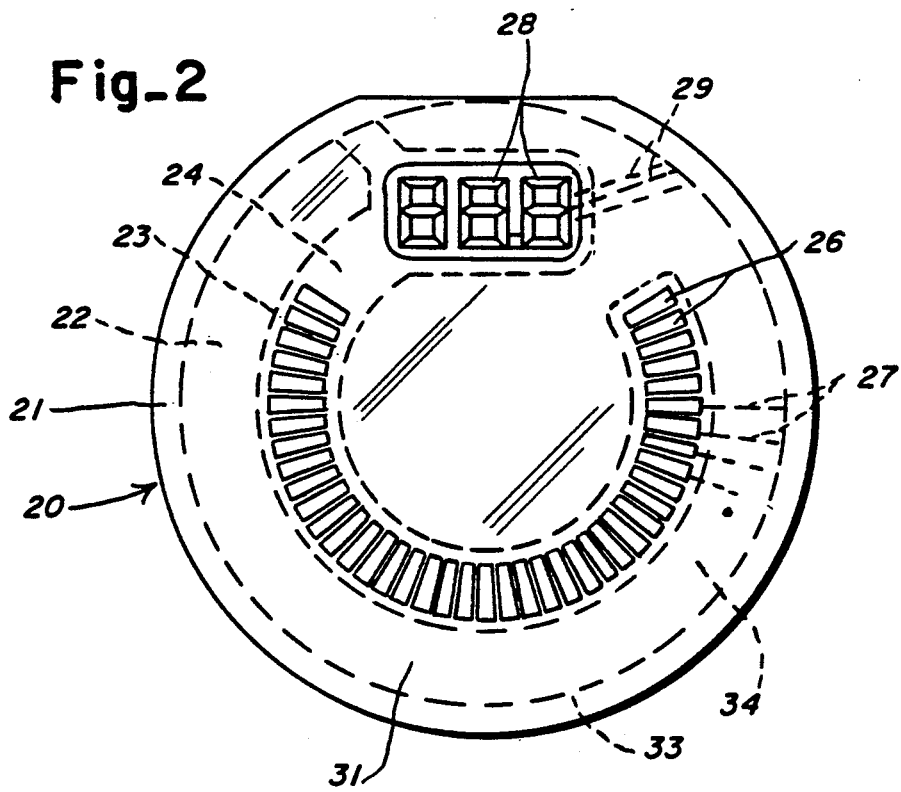

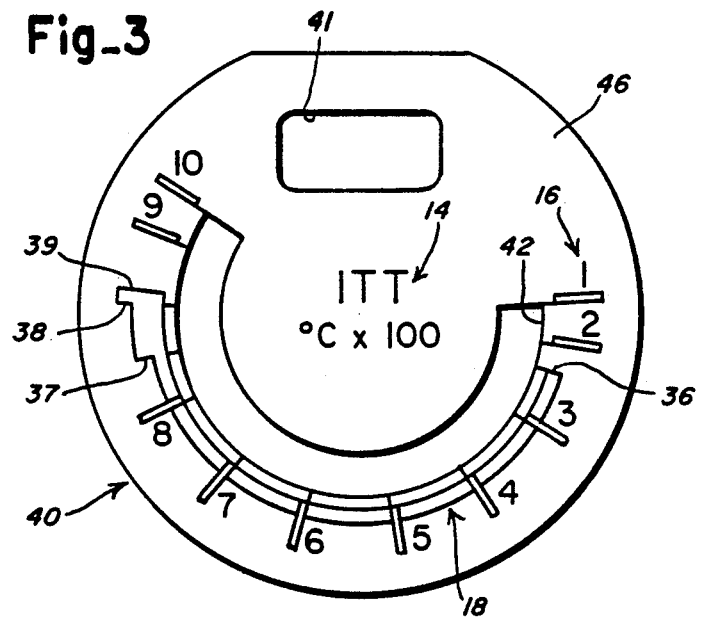
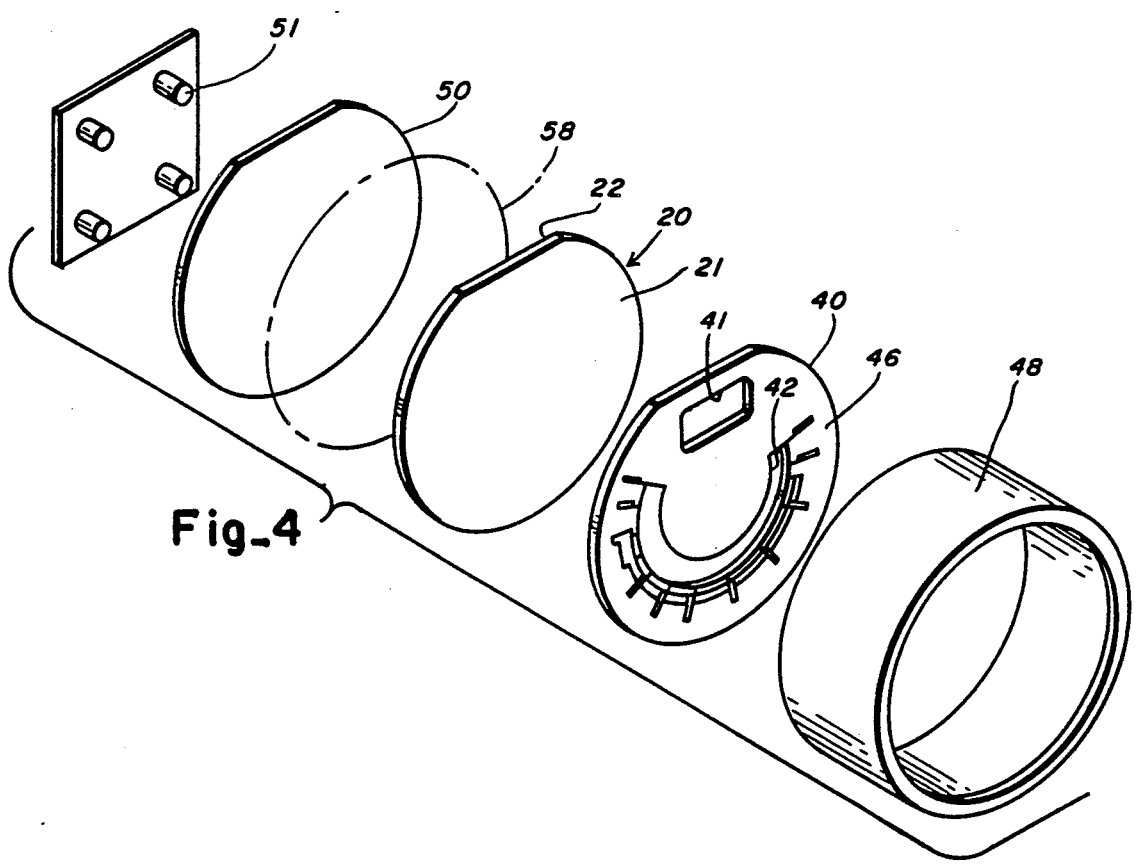

DISPLAY CELL HAVING ACTIVE AND PASSIVE AREAS

BACKGROUND OF THE INVENTION

The invention relates to a liquid crystal display ("LCD") having both active and passive display areas.

LCD's are well known in the art. Such displays are either of the twisted nematic or dichroic dye type; and in order to provide a white-on-black display, a dichroic display is often used. A dichroic display cell comprises two plates of glass with transparent electrodes in a selected pattern on each glass and a liquid crystal containing a dichroic dye trapped in a cavity therebetween. The molecules of the liquid crystal are normally arranged in a helical pattern which causes the dye molecules to assume a helical pattern and absorb any light passing through the cell. A potential difference established between the electrodes causes the liquid crystal and the dye molecules to align themselves perpendicularly to the cell faces allowing light to pass therethrough.

Unlike light emitting displays, LCD's are passive in that they only modulate light and do not generate it. As a consequence, while LCD's are well suited for daylight reading, they are unusable when there is no ambient light unless backlighting or flooding of the LCD is provided. One method of providing light for LCD's involves the use of a transflector which is positioned behind the display. During daytime use, incident light on the front face of the display propagates through the activated elements of the liquid crystal cell and is reflected by the transflector back through the face as light areas. Those portions of the cell which are not in alignment with energized electrodes block the transmission of light to produce a dark background. During night use, a light source behind the transflector floods the rear of the LCD cell with light; and the energized elements of the display transmit the light again producing a light display on a dark background.

In many applications, LCD's may be used in place of electromechanical-type dial indicators with desirable results. LCD's are power efficient; and since they contain no moving parts, failure rate is drastically reduced and life cycle costs are minimized. LCD's function over a wide temperature range, work well under harsh environmental conditions, and, since the LCD's are not restricted by analog or electromechanical limitations, design flexibility is increased. Accordingly, a variety of parameters such as temperature and pressure, speed, torque, position and RPM may be displayed on LCD indicators. Each parameter measurement may be represented on a straight or arcuate fixed element bar graph-type display in combination with a numerical digital readout. However, each indicator should include indicia markings indicating the parameter which is being measured together with suitable units of measurement such as degrees, pounds per square inch, and the like.

According to present technology, all areas of a white-on-black LCD display which are not energized appear black. In order to provide an illuminated display which gives an indication of the parameter being measured and the units of measurement, the measurement read-out as well as the units of measurement and the parameter identification all require energizing electrodes. This approach requires a different electrode pattern to be formed on the LCD cell for each parameter which is to be displayed. Each of the electrodes requires a conductive trace to the outer periphery of the cell which is connected to the driver circuitry. It is often a problem to find vacant areas on the LCD cell across which the traces may be run without crossing other electrode areas. Although it would be possible to reduce the number of electrodes and traces by printing the parameter identification and units of measurement on the face of the LCD, such a presentation would not be visible at night since light from the transflector will not reach the front face of the LCD in any portion of the cell which is not in alignment with an energized electrode.

There is, accordingly, a need in the art for a LCD in which a common fixed element display such as a bar graph may be used for a variety of LCD indicators and in which parameter identification and units of measurement may be presented and back illuminated without the use of electrodes and traces in the LCD cell.

SUMMARY AND OBJECTS OF THE INVENTION

According to the invention, an LCD has both active and passive areas. The active area comprises a sealed cavity in the LCD cell having a display area which is smaller than the area of the total display. The active area contains the normal electrodes and traces well known in the LCD art. The display also includes a passive area which is a portion of the display and is free of dichroic liquid crystal. The passive area is clear and readily allows light to pass through. An opaque mask having indicia thereon covers the passive area of the display. The mask includes clear or translucent portions for parameter identification and measurement units and cutout portions which overlie the active portions of the display. The clear or translucent portions of the mask allow transmission of light from a rear light source without the need for energized electrodes.

It is accordingly an object of the invention to provide an LCD having both active and passive areas.

It is another object of the invention to provide an LCD having active and passive areas in which the active areas present dynamic information readout, and the passive areas present indicia readout.

It is another object of the invention to provide a display having active and passive areas in which the active area information is displayed through the use of dichroic liquid crystal and the passive area information is displayed through the use of a mask.

These and other objects of the invention will become apparent from the following detailed description in which reference numbers used throughout the description correspond to reference numerals found on the drawing figures.

BRIEF DESCRIPTION OF THE DRAWINGS

FIG. 1 shows a display according to the invention.

FIG. 2 shows a liquid crystal cell used in the display of FIG. 1.

FIG. 3 shows a mask which is used in conjunction with the liquid crystal cell of FIG. 2.

FIG. 4 is an exploded perspective view of the various components of an LCD according to the invention.

DESCRIPTION OF THE PREFERRED EMBODIMENT

Figures 5, 6:
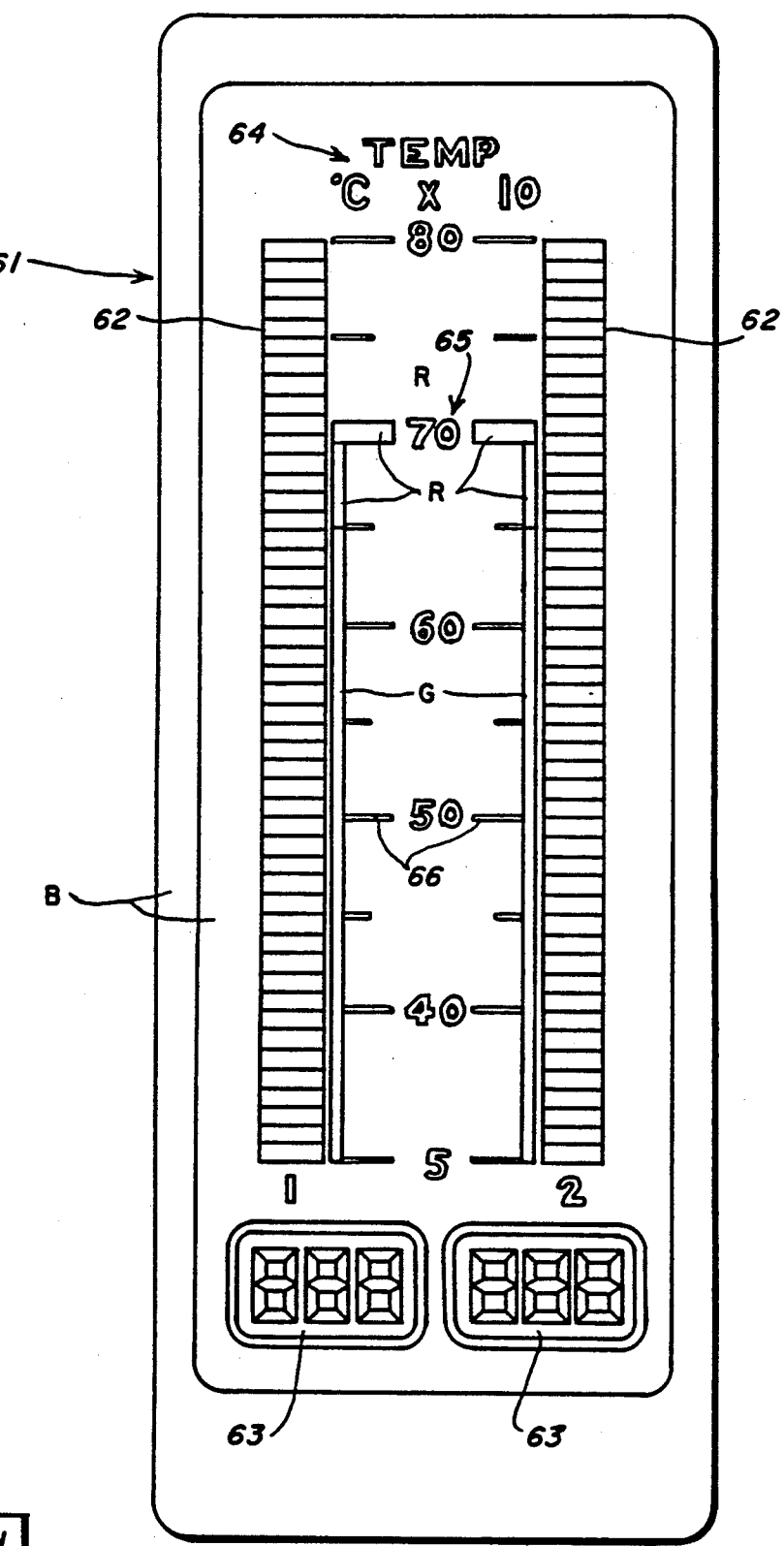
FIG. 5 is an alternate form of display utilizing the principles of the invention.
FIG. 6 is a color chart for the colors indicated by legend in FIGS. 1, 3 and 5.

Turning now to the drawing figures, there is shown in FIG. 1 an LCD generally indicated by the reference numeral 10. The display includes an arcuate fixed element bar graph section 12 and a digital readout section 13, both of which are active. The display further includes a parameter identification indicia 14, parameter units of measurement indicia 16 and bar indicia 18, all of which are passive. The particular display shown gives an indication of engine Inlet Turbine Temperature ("ITT") in °C. It will be understood that as the temperature changes, both the arcuate bar graph section 12 and the digital readout section 13 will change as required in order to give an accurate indication of temperature. The passive display portions 14, 16, and 18 do not change. Both the active portions 12 and 13 and passive portions 14, 16, and 18 of the display are illuminated by a rear light source 51 best seen in FIG. 4.

Turning now to FIG. 2, an LCD cell is generally designated by the reference numeral 20. As well known in the art, the cell comprises a front glass plate 21 and a rear glass plate 22 best seen in FIG. 4. The plates 21 and 22 are spaced from one another and a seal bead 23 between the two plates forms a closed cavity 24. The cavity 24 is filled with a dichroic liquid crystal mixture and a plurality of electrodes 26 are arranged in an arcuate bar graph pattern while a second plurality of electrodes 28 are arranged in three FIG. 8 patterns. In use, the electrodes 26 are energized by means of traces 27 to give an arcuate bar graph readout of ITT, and the electrodes 28 are energized by means of traces 29 to give a numerical digital readout of ITT. The dichroic liquid is confined to the cavity 24 and creates an active area which is substantially less than the total area of the display.

The remaining portion of the display is a passive area 31 which is a substantial portion of the total area of the display. The passive area can be defined as that area of the display which is free of dichroic liquid. A second seal bead 33 is provided around the periphery of the display to secure the front and rear glass plates 21 and 22 together in order to provide a second cavity 34. It may be desirable in certain instances to fill the second cavity 34 with an index matching fluid to provide a display which is uniform in appearance both in the region of the index matching fluid and in the region of the two seal beads 23 and 33 which are often transparent. The use of an indexing matching fluid in the second cavity 34 is optional, however, and may be omitted if desired. In an alternate embodiment, the second cavity 34 may be filled with a colored light transmissive fluid to impart a color to the passive portion of the display.

FIG. 3 shows a mask generally designated by the reference numeral 40 which may be used with the LCD cell of FIG. 2. The mask comprises a rectangular cutout 41, an arcuate cutout 42, the indicia markings 14, 16, and 18, and an opaque background portion 46. The cutouts 41 and 42 are positioned to be in registration with the FIG. 8 elements 28 and the arcuate bar graph elements 26, respectively, of the LCD cell 20 shown in FIG. 2, when the mask 40 is placed against the front glass of the cell. The indicia markings 14, 16, and 18 are in registration with the passive area of the display beyond the perimeter of the closed cavity 24. Although some or all of the traces 27 and 29 may be in registration with the indicia markings 14, 16, and 18 of the mask, the traces are transparent as well known in the art; and accordingly, light from the rear light source 51 is able to pass through the passive area of the display and illuminate the indicia portions 14, 16, and 18. The indicia of the mask may be left clear or colored as desired. As an example, the numerical indicia 16 and the parameter identification indicia 14 may be white, the bar indicia 18 between points 36 and 37 may be green followed by thicker yellow indicia between points 37 and 38 and thicker red indicia between points 38 and 39. The opaque background area 46 of the mask may be black or any color desired as long as contrast is provided with the indicia portions 14, 16, and 18.

FIG. 4 is an exploded perspective view of an LCD dial indicator which has been removed from the housing 48. The mask 40 is positioned adjacent the front glass 21 of the LCD cell 20, and a transflector 50 is positioned adjacent the rear glass 22. The transflector 50 acts as a light diffuser for the LCD cell 20 in either a reflective mode in which light entering from the front of the LCD is reflected back through the LCD, or in a passive mode in which the transflector 50 is a diffuser for one or more lamps 51 positioned behind the transflector.

Although the mask 40 is shown positioned on the front surface of the LCD 20, it may also be positioned on the rear surface of the LCD between the display and the transflector 50 as shown by the phantom outline 58. In either position, the mask blocks light from the transflector 50 in those regions 46 which are opaque and allows light to pass through the indicia portions 14, 16, and 18 and through the cutout portions 41 and 42. The light from the transflector 50 which appears in the cutouts 41 and 42 is additionally controlled by the dichroic liquid crystal contained within the central cavity 24. In this way the information appearing in the cutouts 41 and 42 may be changed while the information appearing in the indicia portions 14, 16, and 18 are unchangeable.

Through the use of the invention, the same arcuate bar graph electrodes 26 and digital numerical electrodes 28 may be used with different masks 40 in order to provide different parameter presentations.

FIG. 5 shows an alternate form of the invention in which the principles of an LCD dial indicator are applied to an indicator having a vertical format. The active portions of the vertical display 61 comprise the two vertical bar graph indicators 62 and the two numerical digital readouts 63. The passive portions of the display which are created by a mask comprise the TEMP, °C × 10 logo 64 at the top of the display, and the numerical indicia 65 and scale markings 66 positioned between the two bar graph indicators 62. The indicator of FIG. 5 may be used to monitor the temperature of two engines, or the manifold and exhaust temperature of a single engine, or any two other temperatures. As in the description of the invention in conjunction with FIGS. 1-4 above, the same active portions of the display 61 may be combined with other passive portions through the use of different masks in order to provide different indicators.

Having thus described the invention, various alterations and modifications will occur to those skilled in the art, which modifications and alterations are intended to be within the scope of the invention as defined by the appended claims.

What is claimed is:

1. A display having both active and passive areas comprising:

a front glass and a rear glass;

a first sealed cavity formed between the front glass and rear glass, the first sealed cavity being filled with liquid crystal material and defining an active area which is substantially less than the total area of the display;

electrode means for selectively energizing the liquid crystal material;

a second cavity formed between the front glass and rear glass, the second cavity being free of liquid crystal material and defining a passive area which is a substantial portion of the total viewing area of the display;

a mask on the passive area having indicia thereon, the mask comprising cutout areas in registration with the first sealed cavity and an opaque material having light transmissive areas which form the indicia in registration with the second cavity; and a light source behind the rear glass, whereby the active area of the display is varied by selective energization of the liquid material, and whereby the indicia on the mask is illuminated by the light source.

2. The display of claim 1 further comprising:
a lamp and a transflector comprising the light source.

3. The display of claim 1 further comprising:
clear areas and colored areas comprising the light transmissive areas of the mask, whereby the passive area of the display is in plural colors.

4. The display of claim 3 wherein the mask is located adjacent the front glass.

5. The display of claim 3 wherein the mask is located between the rear glass and the transflector.

6. The display having both active and passive areas comprising:
an LCD cell comprising a front glass and a rear glass;
a seal bead between the front glass and rear glass;
a first sealed cavity formed by the seal bead, the first sealed cavity being filled with liquid crystal material and defining an active area which is substantially less than the total area of the display;

a second cavity between the front glass and rear glass, the second cavity being free of liquid crystal material and defining a passive area of the display;

a mask having light transmitting indicia thereon in registration with the second cavity;

cutout areas on the mask in registration with portions of the first sealed cavity; and illumination means positioned behind the LCD cell, whereby the light transmitting indicia on the mask is illuminated by the illumination means.

7. The display of claim 6 further comprising:
a transflector and a light source positioned behind the transflector comprising the illumination means.

8. The display of claim 1 wherein the mask is positioned on the front glass.

9. The display of claim 8 wherein the indicia are clear.

10. The display of claim 8 wherein the indicia are translucent and colored.

11. The display of claim 8 wherein some of the indicia are clear and some are colored.

12. The display of claim 8 further comprising:
a selected pattern of electrodes in the first sealed cavity in registration with the cutout areas of the mask; and
a plurality of conductive traces on the front and rear glass each having one end coupled to one of the electrodes and another end located at the periphery of the front and rear glass, wherein some of the conductive traces are in alignment with the light transmitting areas comprising the indicia.

13. The display of claim 1 wherein the mask is positioned on the rear glass between the rear glass and the transflector.

14. The display of claim 13 wherein the indicia are clear.

15. The display of claim 13 wherein the indicia are translucent and colored.

16. The display of claim 13 wherein some of teh indicia are clear and some are colored.

* * * * *